United States Patent
Jepsen et al.

(10) Patent No.: US 7,972,419 B2
(45) Date of Patent: Jul. 5, 2011

(54) APPARATUS AND METHOD FOR REDUCING EMISSIONS RESULTING FROM RAW MEAL GRINDING

(75) Inventors: Ove L. Jepsen, Bethlehem, PA (US); Steven Miller, Bethlehem, PA (US); Anthony Shave, Bethlehem, PA (US)

(73) Assignee: FLSmidth A/S (DK)

( * ) Notice: Subject to any disclaimer, the term of this patent is extended or adjusted under 35 U.S.C. 154(b) by 428 days.

(21) Appl. No.: 12/221,906

(22) Filed: Aug. 7, 2008

(65) Prior Publication Data

US 2010/0031821 A1    Feb. 11, 2010

(51) Int. Cl.
*F27B 15/00* (2006.01)
(52) U.S. Cl. ......... 95/273; 55/385.1; 106/739; 106/758; 106/766; 201/1; 423/210; 423/239.1; 423/244.01; 432/72
(58) Field of Classification Search ................ 55/385.1; 95/128; 106/739, 758, 766; 201/1; 423/210, 423/239.1, 244.01; 432/72
See application file for complete search history.

(56) References Cited

U.S. PATENT DOCUMENTS

| | | | | |
|---|---|---|---|---|
| 4,135,941 A * | 1/1979 | Skalny et al. | | 106/766 |
| 4,204,835 A * | 5/1980 | Porter | | 432/58 |
| 4,366,000 A * | 12/1982 | Wadia | | 106/758 |
| 5,169,611 A * | 12/1992 | Kupper et al. | | 423/210 |
| 5,219,544 A * | 6/1993 | Kupper et al. | | 423/239.1 |
| 5,264,013 A * | 11/1993 | Brentrup | | 95/128 |
| 5,349,910 A * | 9/1994 | Hundebol | | 110/346 |
| 5,927,967 A * | 7/1999 | Bauer et al. | | 432/72 |
| 6,264,738 B1 * | 7/2001 | Lorke et al. | | 106/739 |
| 2005/0039638 A1 * | 2/2005 | Leung et al. | | 106/745 |
| 2007/0261618 A1 * | 11/2007 | Kastingschafer et al. | | 110/251 |
| 2009/0169453 A1 * | 7/2009 | Saito et al. | | 423/235 |
| 2010/0050906 A1 * | 3/2010 | Schurmann et al. | | 106/771 |
| 2010/0300864 A1 * | 12/2010 | Jepsen et al. | | 201/1 |

* cited by examiner

*Primary Examiner* — Duane Smith
*Assistant Examiner* — Minh-Chau Pham
(74) *Attorney, Agent, or Firm* — Daniel DeJoseph; Aaron M. Pile

(57) ABSTRACT

Disclosed is a method for reducing emissions from exhaust gas generated during the grinding and drying of cement raw meal as part of a cement manufacturing process. The invention comprises circuiting the exhaust gas between a raw mill and a clinker cooler. In the clinker cooler at least a portion of said emissions are delivered to a cement kiln in which said emissions are removed by being combusted and/or absorbed.

15 Claims, 1 Drawing Sheet

APPARATUS AND METHOD FOR REDUCING EMISSIONS RESULTING FROM RAW MEAL GRINDING

The present invention relates to a method for manufacturing cement clinker and more specifically to the raw grinding phase of cement manufacture. The invention relates specifically to a method for reducing the emissions of contaminants generated in the raw grinding process. The invention also relates to an apparatus for carrying out the method.

BACKGROUND OF THE INVENTION

In a standard cement manufacturing process, the raw materials needed to produce cement are first mixed and fed to raw grinding mills to produce "raw meal". The raw meal is ground and dried in the mill and then sent to a kiln in which it is heated to about 1,500° C. to produce clinker, the basic material required for the production of all cements. The clinker is thereafter transported to a cooler and, after cooling, the material is subject to finish grinding.

In the clinker cooler the clinker is cooled from about 1,400° C. to about 90° C. by ambient air supplied by a forced draft or natural draft supply system that passes through the clinker. A predetermined portion, generally about 40-50%, of the air used to cool the clinker is thereafter directed into the rotary kiln for use as combustion air. Since a significant amount of air passing through the cooler is not utilized in the kiln, excess air from the cooler is typically vented to the atmosphere, used for drying coal or raw materials, or used as an air source in other areas of a cement plant.

A raw grinding mill is generally operated according to the principle of drying and grinding, and uses heated gases in the drying stage that are typically delivered to it from other areas of the plant, such as from the preheater and, at times, the clinker cooler.

The cement industry in the United States has a long-standing commitment to reduce the industry's environmental footprint. In the 1990s, in response to concerns about smog and acid rain, the industry installed new technologies such as low $NO_x$ burners to reduce emissions of $NO_x$ and fine particulate. Most cement plants now have emissions monitoring systems in place.

The raw grinding operation traditionally has not been a point of focus in the industry's battle against undesirable emissions, as the raw mill is simply not a major source of emissions within a cement plant. However, as government emission standards are becoming more and more stringent, the industry is looking to reduce emissions in areas that heretofore have not been under scrutiny. On that basis, it has been discovered that the grinding of raw materials can produce certain undesirable emissions, including volatile organic compounds (VOCs), methane, and CO, among others. It would be desirable, therefore, to have a method for reducing emissions generated by the raw material grinding process.

SUMMARY OF THE INVENTION

The invention is a method for reducing emissions from exhaust gas generated during the grinding and drying of cement raw meal as part of a cement manufacturing process. The invention comprises circuiting the exhaust gas between a raw mill and a clinker cooler. In the clinker cooler at least a portion of the emissions are delivered to a cement kiln in which said emissions are removed by being combusted and/or absorbed.

DESCRIPTION OF THE DRAWING

The invention will be further explained below with reference to FIG. 1, which is a flow diagram of an example of the invention, largely as a block diagram that, of course, is not drawn to scale.

DETAILED DESCRIPTION OF THE INVENTION

Figure 1:
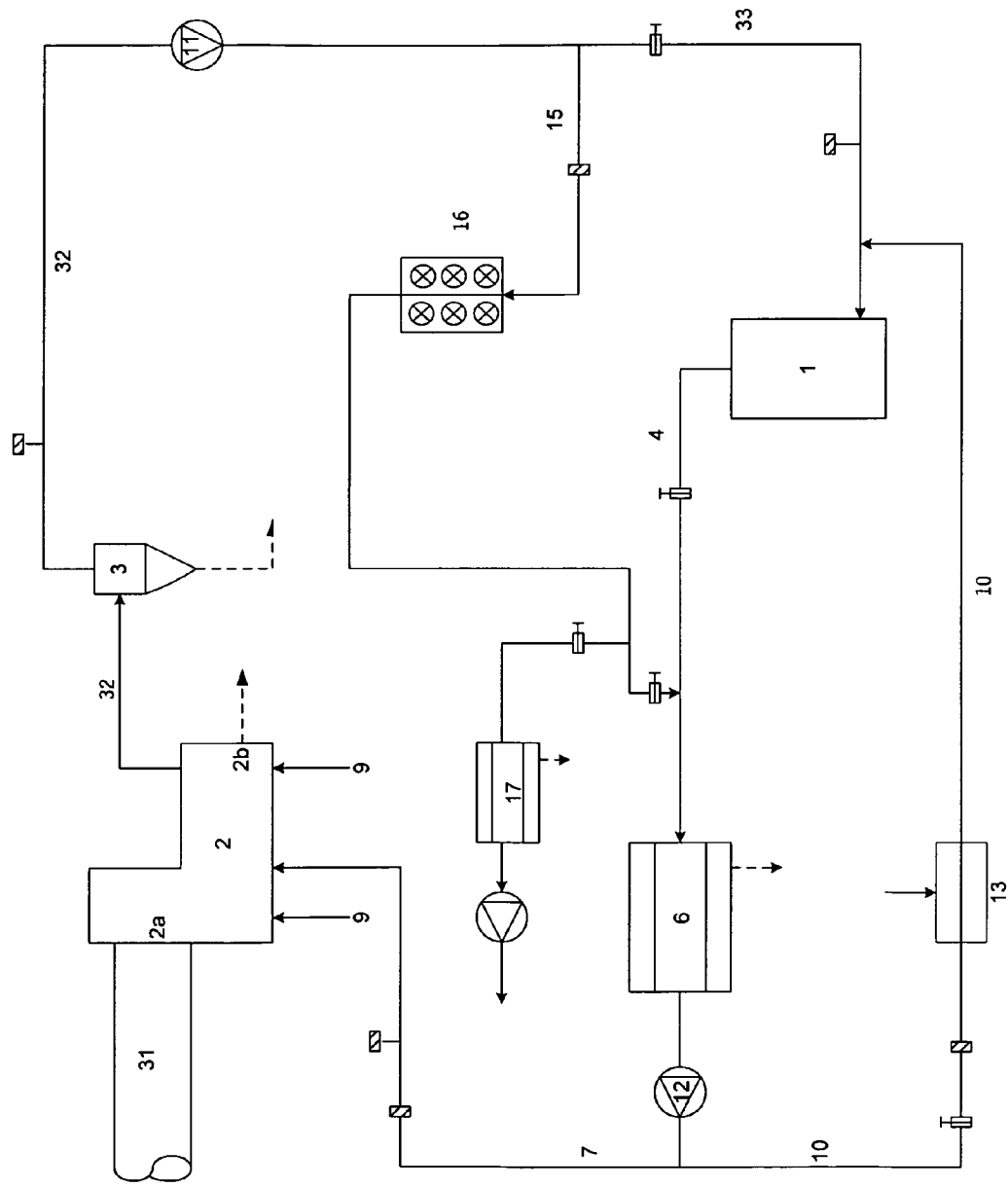

The principal apparatus or apparatus parts for carrying out the method according to the invention will be explained in somewhat general terms with reference to the block flow diagram shown in the FIG. 1. It is understood that FIG. 1 does not depict a complete cement plant installation (as, for example, the preheater, among other critical components of a standard cement plant, are not shown) but is directed to essentially the raw mill/clinker cooler circuit that is the heart of the present invention.

According to the present invention, there is a raw material grinding installation 1, in which the raw material utilized in a cement operation is prepared. Also shown is kiln 31 and clinker cooler 2 which, in terms of the direction of material flow in the cement plant, are located downstream from raw mill 1.

It is a primary feature of the invention that, in order to treat the emissions from the raw mill, at least a first portion of the off gases from raw mill 1 are directed to clinker cooler 2. From clinker cooler 2 a significant portion of the off gases are then directed into kiln 31 wherein the emissions are removed, such as by being combusted in the high temperature kiln and/or by being absorbed by the materials being heat treated within the kiln. It is a further feature of the present invention that there is preferably a circuiting of off gas flow between the raw mill 1 and clinker cooler 2.

The minimum temperatures needed to ensure combustion of such raw meal emissions will be in the range of about 800-850° C. It is clear that the temperatures realized in a kiln during the cement manufacturing process are well in excess of this minimum, and thus are suitable to combust the emissions.

With regard to the circuiting feature, a portion of the air entering clinker cooler 2 exits as exhaust gases via conduit 32. These exhaust gases are heated to approximate 250°-330° C. and are first directed via clinker cooler exhaust conduit 32 to a dust recovery system, such as cyclone 3, so that dust can be recycled to the pyro-processing portion of the cement making process. In line cooler vent fan 11 helps to control kiln hood pressure. The dedusted cooler exhaust gases are directed as drying gases into raw mill 1 via conduits 32 and 33. If the cooler exhaust gases do not provide sufficient heat for the raw feed, additional heat can be utilized from other heat sources within the plant, such as the raw mill preheater (not shown) or can be brought in from external sources.

The raw feed in mill 1, i.e., cool, wet limestone, creates a large heat exchange surface, decreasing the temperature of the gases entering the mill. The ground raw feed is entrained in gases and is directed via raw mill exhaust conduit 4 to a dust collector 6, for example, a baghouse or an electrostatic precipitator. The cooled (approximately 90° C.) gases are separated from product and are directed via dust collector exhaust conduit 7 to mill fan 12 from which a first portion (typically from about 10% to about 90%) of the separated gases are thereafter directed via conduit 7 to clinker cooler 2, in which they are combined with fresh air entering the cooler via one or more conduits 9 to become cooling air, while a second portion of the gases are recycled back to raw mill 1 via recirculation conduit 10 to supplement the off gases from the clinker cooler. If needed these recycled gases may be heated by optional in line external heat source 13 prior to being returned to raw mill 1.

Although a two fan mill system (cooler vent fan 11 and mill fan 12) is depicted, it is understood that optionally a three fan mill system can be utilized, which would entail placing both one or more cyclones (not shown) in series for removing raw meal product from the gas stream and a third mill fan between the material outlet of raw mill 1 and the inlet of dust collector 6. Advantages to the three mill fan system are that, from a control perspective, a three fan system is easier to control and, more importantly, may allow for a much smaller dust collector 6.

As indicated, in normal cement plant operation, approximately 40-50% of the cooling air (the lesser number is more typical of older coolers) is directed from the cooler into the kiln located upstream of the cooler and the balance of the air is vented to atmosphere. In the process of the present invention the majority, and preferably all of, this latter air that is not directed into the kiln is sent back to the raw mill to keep the raw mill emissions within the closed loop of the raw mill/clinker cooler system, although a small amount of such air may be directed to other operations in the cement plant, such as a burner (not shown), in which the emissions will be consumed. Obviously, venting a major portion of the emission containing cooler off gases would not be in accordance with the present invention.

The percentage of emission containing gases that will actually be directed from the cooler into the kiln, as opposed to exiting as exhaust gases via conduit 32, will depend to a great extent on the location at which these gases are inserted into the cooler. As a general rule, the closer the gases are inserted to cooler material inlet 2a (as opposed to cooler material outlet 2b) the greater percentage of such gases will be directed into the kiln. It can be appreciated that this situation can be complicated by having the raw mill off gases being inserted into the cooler at a number of locations between inlet 2a and outlet 2b.

When the raw mill is down, it is important for the exhaust gases from the cooler to remain in what is essentially a closed circuit to gradually purge the system of raw mill emissions. In such a case, the clinker cooler will operate as a full recirculation cooler, by closing conduit 33 and having the off gases being diverted from conduit 32 to conduit 15. The gases will pass through cooling device 16 which can be, for example, an indirect heat exchanger to bring the gases down to a temperature suitable for reinsertion into the clinker cooler. In the event of an upset or an emergency condition, a small amount of the diverted gases can be directed through secondary dust collector 17 and then vented.

Although the present invention has been described by several embodiments, various changes and modifications may be suggested to one skilled in the art. It is intended that the present invention encompass such changes and modifications as fall within the scope of claims appended hereto.

What is claimed is:
1. A method for reducing emissions from exhaust gas generated during the grinding and drying of cement raw meal as part of a cement manufacturing process, comprising
   (a) inserting at least a first portion of said emission containing exhaust gas, from which entrained ground raw meal product has been removed, into a clinker cooler, in which said clinker cooler the exhaust gas, in combination with fresh air, acts as cooling gas for cooling cement clinker supplied from a kiln, and
   (b) thereafter directing at least some of said emission-containing cooling gas from the cooler to the kiln for removing the emissions therein.

2. The method of claim 1 further comprising redirecting at least a portion of the emission-containing cooling gas that is not directed to the kiln back to the raw mill to act as drying gas on the cement raw meal.

3. The method of claim 2 further comprising redirecting a second portion of the exhaust gas from the raw mill back to the raw mill to act as drying gas on the cement raw meal.

4. The method of claim 3 wherein the redirected gas is heated prior to being inserted in the raw mill.

5. The method of claim 2 wherein a baghouse is utilized to remove entrained ground raw meal from the exhaust gas.

6. The method of claim 2 wherein the raw mill utilizes a two fan arrangement.

7. The method of claim 2 wherein the raw mill utilizes a three fan arrangement.

8. A method for reducing emissions from exhaust gas generated during the grinding and drying of cement raw meal as part of a cement manufacturing process, comprising
   (a) inserting at least a portion of said exhaust gas, from which entrained ground raw meal product has been removed, into a clinker cooler in which said clinker cooler the exhaust gas, in combination with fresh air, acts as cooling gas for cooling cement clinker supplied from a kiln;
   (b) thereafter directing at least some of said emission-containing cooling gas from the cooler to the kiln for removing the emissions in said cooling gas; and
   (c) redirecting at least a portion of the emission-containing cooling gas that is not directed to the kiln back to the raw mill to act as drying gas on the cement raw meal.

9. An apparatus for reducing emissions from exhaust gas generated during the grinding and drying of cement raw meal as part of a cement manufacturing process, said apparatus comprising
   (a) a kiln for the production of hot cement clinker having an end through which clinker is discharged from the kiln and combustion air is received into the kiln, said kiln being maintained at a sufficient temperature to combust raw mill emissions;
   (b) a clinker cooler positioned to receive clinker from the kiln and deliver combustion air into the kiln;
   (c) a raw mill in which said cement raw meal is ground and dried, said raw meal discharging an untreated gas stream containing entrained ground and dried cement raw meal and unwanted raw mill emissions from the grinding of the raw meal;
   (d) a raw mill exhaust conduit in fluid communication with said raw mill and adapted to transport said untreated gas stream from said raw mill;
   (e) a dust collector in fluid communication with said raw mill exhaust conduit to thereby receive said untreated gas stream from said raw mill, precipitate the cement raw meal, and discharge a gas stream containing unwanted emissions;
   (f) a dust collector exhaust conduit in fluid communication with both said dust collector and said clinker cooler so as to receive said emission-containing gas stream from said dust collector and to direct at least a first portion of said emission-containing gas stream to said clinker cooler, from which at least some of said at least first portion of the emission-containing gas waste stream will be delivered to the kiln to remove the emissions therein.

10. The apparatus of claim 9 further comprising a recirculation conduit in fluid communication with said dust collector exhaust conduit and said raw mill so as to receive a second portion of said emission-containing gas waste stream system and to direct said second portion to the raw mill.

11. The apparatus of claim 10 further comprising a heat source to heat said second portion of said emission-containing gaseous waste stream to a temperature suitable to dry raw meal within the raw mill.

12. The apparatus of claim 9 wherein the dust collector is a baghouse.

13. The apparatus of claim 9 further comprising at least one cyclone in line with said raw mill exhaust conduit located between and in fluid communication with both said raw mill and said dust collector for removing at least some of said raw meal from said gaseous stream.

14. The apparatus of claim 9 wherein the unwanted emissions comprise VOCs, methane, and CO.

15. The apparatus of claim 9 wherein said first portion of said emission-containing gaseous waste stream directed to said clinker cooler comprises between about 10% to about 90% of said emission-containing gaseous waste stream.

* * * * *